Aug. 23, 1938.   W. H. DINGWERTH   2,127,969
METHOD OF ASSEMBLING FLAT PLATES TO SHAFTS
Filed Oct. 7, 1935

INVENTOR
William H. Dingwerth
BY
Spencer, Hardman & Fehr
his ATTORNEYS

Patented Aug. 23, 1938

2,127,969

UNITED STATES PATENT OFFICE 2,127,969

METHOD OF ASSEMBLING FLAT PLATES TO SHAFTS

William H. Dingwerth, Anderson, Ind., assignor to General Motors Corporation, Detroit, Mich., a corporation of Delaware Application October 7, 1935, Serial No. 43,897

9 Claims. (Cl. 29—148)

This invention relates to an improvement in methods of assembling substantially flat plates to other parts, particular reference being made to weight or supporting plates and the attachment thereof to a shaft of an automatic ignition timer.

Under the present practice the shaft is provided with a knurled portion and an annular groove located just below the knurled portion in which a washer is shrunk into the groove. The washer acts as a shoulder on the shaft which supports a weight or supporting plate. When the plate is pressed on the knurled portion of the shaft, the knurled portion embeds in the reamed hole provided by the weight or supporting plate and serves as a key to keep the plate from turning relative to the shaft. No provisions are made to prevent the plate from moving axially and coming off of the shaft, except the friction of the supporting plate on the knurled portion. In certain instances, it has been found that the supporting plate has worked loose from the knurled portion and pushed off therefrom.

It is among the objects of the present invention to provide an improved method for forming the supporting plate without fracturing the metal of the plate and for attaching the plate to a shaft so that it will require greater torque to turn the plate relative to the shaft, require higher push-off pressure to shove the plate from the shaft, and to provide a larger area for a joint connection between the shaft and the supporting plate and at the same time producing a rigid and unitary structure.

Further objects and advantages of the present invention will be apparent from the following description, reference being had to the accompanying drawing wherein a preferred embodiment of the present invention is clearly shown.

Figure 1:
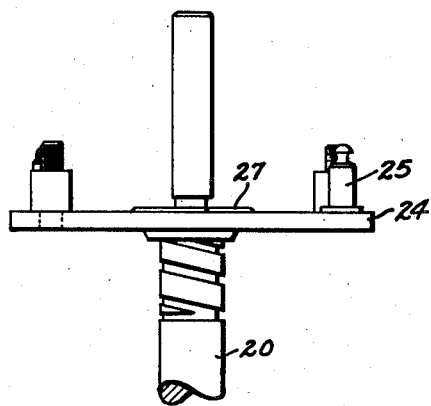
Fig. 1 is a fragmentary view showing a portion of the timer drive shaft and a supporting plate attached thereto.
Figure 2:
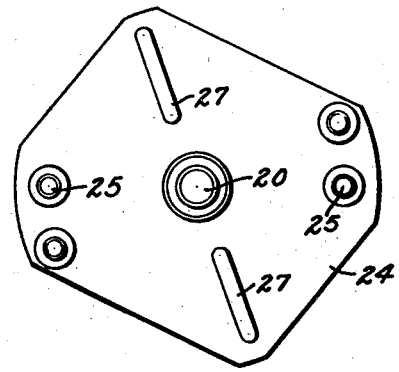
Fig. 2 is a top plan view of the parts shown in Fig. 1.

Referring to the drawing, 20 is a timer shaft adapted to be rotatably supported in a timer housing, not shown. The shaft is provided intermediate its ends with a knurled portion 22 and an annular groove 23 located underneath the knurled portion. A weight supporting base or plate 24 is first forced over the knurled portion plate 24 and then a portion of the plate is forced into the groove 23 in order to provide a driving connection between the shaft 20 and the plate 24. The plate 24 carries pivot studs 25 each adapted to pivotally support a flat weight, not shown, which will slide across a ridge 27 provided by the weight plate 24.

The method and means of securing a weight supporting plate 30 to the shaft 20 will now be described. This means is particularly illustrated in Figs. 3 to 8 inclusive.

Figure 4:
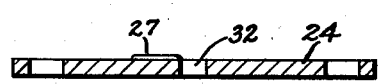
Fig. 4 is a sectional view of the weight plate after drilling a small hole in the plate.
Figure 3:
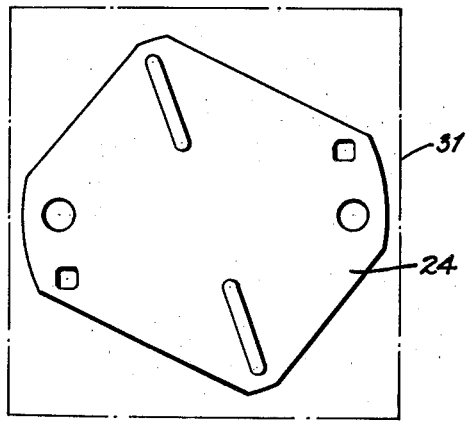
Fig. 3 is a plan view of the weight plate after it has been blanked from a piece of sheet metal indicated by dot-and-dash lines.
Figure 5:
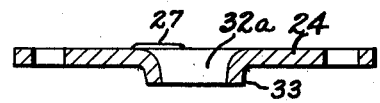
Fig. 5 is a sectional view of the plate showing the metal rolled from the plane of the plate to form a flange.
Figure 6:
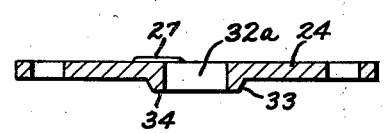
Fig. 6 is a sectional view of the plate after the flanged portion of the plate has been coined to dimensions prior to forcing same upon a shaft.

Fig. 3 shows the supporting plate 24 blanked from a sheet of metal 31 of suitable thickness shown in dot-and-dash lines. It will be noted that when supporting plate is blanked from sheet metal, the plate is not provided with a central opening. Fig. 4 shows an opening 32 in the weight base that is substantially along the axis of the plate. This opening is preferably drilled through the plate so as to not fracture the metal about the central area of the plate. The supporting plate is then placed into a suitable drawing die, not shown, which operates to force the metal about the opening 32 away from the plane of the plate 30 to form a larger opening 32a and a hub or flange 33, as shown in Fig. 5. After the metal has been drawn, as indicated in Fig. 5, the plate is placed into a seating die to coin or shape the flange so as to make more dense the metal constituting the walls of the opening 32a and to bring the opening 32a to the desired dimension, as shown in Fig. 6.

Figure 7:
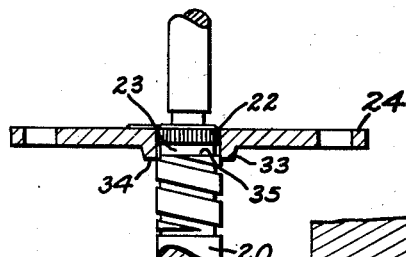
Fig. 7 is a sectional view showing the plate forced onto the shaft.
Figure 8:
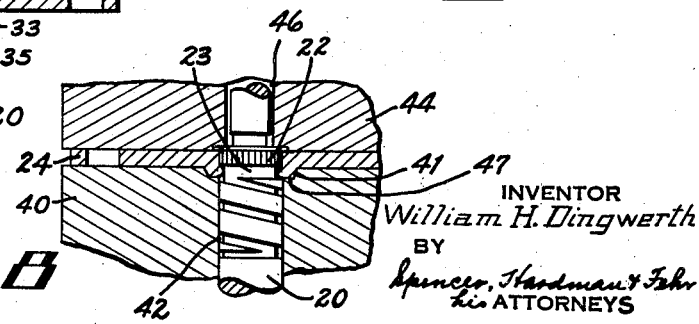
Fig. 8 is a fragmentary view of a tool for further securing the plate to the shaft.

The plate is then forced over the knurled portion 22 of the shaft 20 so that the lower edge 34 of the hub or flange will preferably extend slightly beyond the lower side 35 of the undercut or groove 23 as clearly shown in Fig. 7. The knurled portion 22 is embedded in the walls of the opening 32a to provide a key or non-rotative joint between the plate 24 and the shaft 20.

After the plate 24 is forced over the knurled portion 22 of the shaft 20, the assembly, comprising the supporting plate 24 and the shaft 20, is placed into a swedging die which cold flows the metal of the flange 33 below knurled portion into the annular groove 23 thereby preventing the plate from moving axially with respect to the shaft and also perfecting the relatively non-rotatable joint between the plate and the shaft and at the same time producing a rigid and unitary structure. This operation also positions the plate 24 so that the plane of the plate will be substantially at right angles to the axis of the shaft 20.

The mechanism for cold flowing the metal of the flange into the annular groove comprises a stationary base 40 having a tapered recess 41 and an opening 42 to receive the flange 33 and the shaft 20 respectively. A movable head member 44 of the swedging die is provided with an opening 46 to receive the reduced end of the shaft 20. The movable head member is adapted to be moved by suitable power means toward the stationary base 40 and as head member forces the plate 24 toward the base 40, the bottom 47 of the recess 41 forces the metal of the flange 33 upwardly toward the head member 44 while the tapered portion of the recess urges the metal inwardly into the annular groove 23 as indicated at 45 thus fixedly securing the plate 24 upon the shaft 20 against axial movement thereof.

While the embodiment of the present invention as herein disclosed, constitutes a preferred form, it is to be understood that other forms might be adopted, all coming within the scope of the claims which follow.

What is claimed is as follows:

1. The method of affixing a plate to a shaft having a knurled portion, comprising the steps which include, blanking the plate, forming an opening in the plate, drawing the material about the opening away from the plane of the plate to form a larger opening, forcing the plate on the shaft, and then forcing the drawn material below the knurled portion of the shaft.

2. The method of affixing a metallic plate to a shaft having a knurled portion, comprising the steps which include, blanking the plate, forming an aperture in the plate, drawing the metal about the aperture below the plane of the plate to enlarge the opening, forcing the plate onto the knurled portion of the shaft, and then forcing the drawn metal underneath the knurled portion of the shaft whereby the plate is prevented from rotary and axial movements in either direction.

3. The method of affixing a metallic plate to a metallic shaft having an irregular portion and an annular groove, comprising the steps which include, blanking the plate, drilling an aperture in the plate, forcing the metal about the aperture beyond the plane of the plate and change the contour of the opening, forcing the plate over the irregular portion of the shaft so that a portion of projecting metal of the plate will extend beyond the irregular portion, and then swaging the extending portion of the metal toward the shaft and underneath the irregular portion into the groove whereby rotary and axial movements of the plate relative to the shaft is prevented.

4. The method of attaching a substantially flat plate to a shaft having a knurled portion and an annular groove below the knurled portion, comprising the steps which include, blanking the plate, drilling an opening in the plate, rolling the metal about the opening beyond the plane of the plate to form a flange and to enlarge the opening, forcing the flanged portion of the plate onto the knurled portion of the shaft so that a portion of this flange portion will extend beyond the knurled portion, and then forcing the extending portion of the flange toward and underneath the knurled portion into the annular groove of the shaft to prevent rotary and axial movements of the plate on the shaft.

5. The method of attaching a substantially flat plate to a shaft, having a knurled portion and an annular groove below the knurled portion, comprising the steps which include, blanking the plate, drilling an opening in the plate, rolling the metal about the opening beyond the plane of the plate to increase the dimensions of the opening and to form a flange, forcing the flange portion of the plate over the knurled portion of the shaft so that a portion of the flange will extend slightly beyond the annular groove, and then forcing a portion of the flange into the annular groove for holding the plate in a fixed relation with the shaft.

6. The method of attaching a plate to a shaft having a knurled portion and an undercut portion intermediate its ends, comprising the steps which include, blanking the plate to dimensions, drilling a hole substantially in the center of the plate, drawing the metal about the hole out of the plane of the plate to increase the dimension of the hole and to form a flange, coining the flange to dimensions, forcing the plate over the knurled portion of the shaft and having the flange extend slightly beyond the undercut of the shaft, and then producing a force on the section of metal adjacent the undercut causing an inward flow of the metal into the undercut portion with the section of metal adjacent the knurled portion remaining substantially stationary whereby rotary and axial movement between the shaft and plate is prevented.

7. The method of securing a member to a shaft to interlock against rotation and axial movements in either direction, comprising the steps which include forming the shaft with a knurled portion and an annular groove, forming a small opening in the plate, drawing the material about the opening below the plane of the plate forming a larger opening and a flange, compressing the drawn material and truing the opening, forcing the member over the knurled portion of the shaft so that a portion of the flange will project beyond the knurled portion and over the groove, and then forcing the projecting portion into the groove.

8. The method of affixing a plate to a shaft having a groove, comprising the steps which include, blanking the plate from sheet metal, drilling an opening in the plate, drawing the metal about the opening away from the plane of the plate to extend the dimensions of the opening and forming flange, coining the drawn metal to size and increasing the compactness of the metal forming the opening, forcing the plate on the shaft, then forcing the compact metal of the flange in the groove of the shaft whereby the plate is held against rotary and axial movements in either direction upon the shaft.

9. The method of forming in a member an opening having a surrounding projecting flange without fracturing the metal, comprising the steps which include, drilling a small aperture in the member, drawing the metal about the opening away from the plane of the plate to increase the length and size of the opening, and then coining the drawn metal to size increasing the compactness of the metal that forms the walls of the lengthened and enlarged opening.

WILLIAM H. DINGWERTH.